Nov. 16, 1965   A. E. JENSEN   3,218,105
AGRICULTURAL WHEEL CONSTRUCTION
Filed Nov. 26, 1963
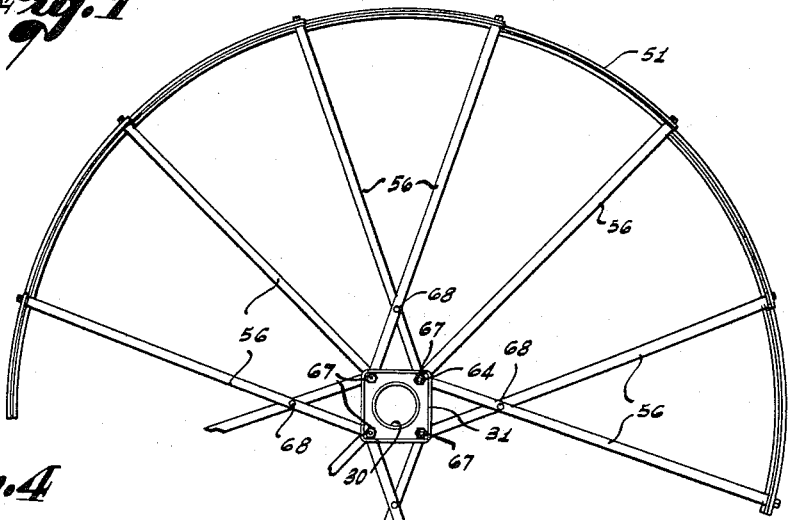
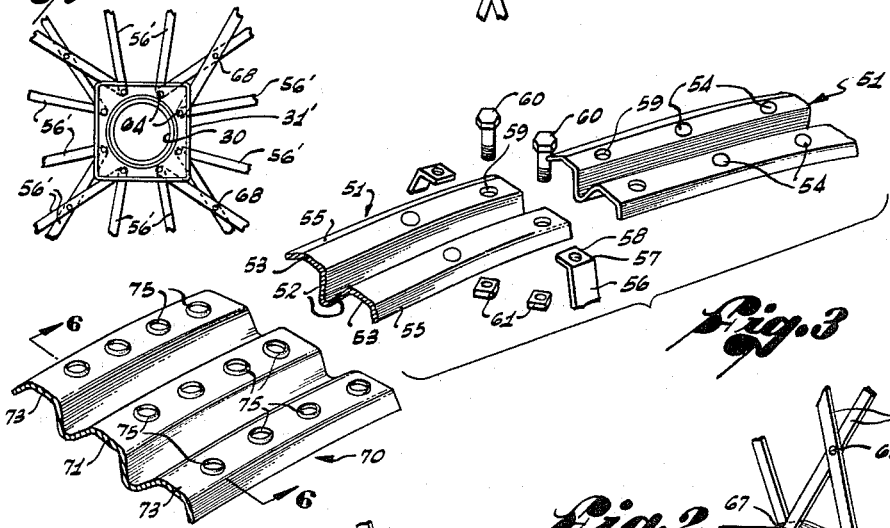
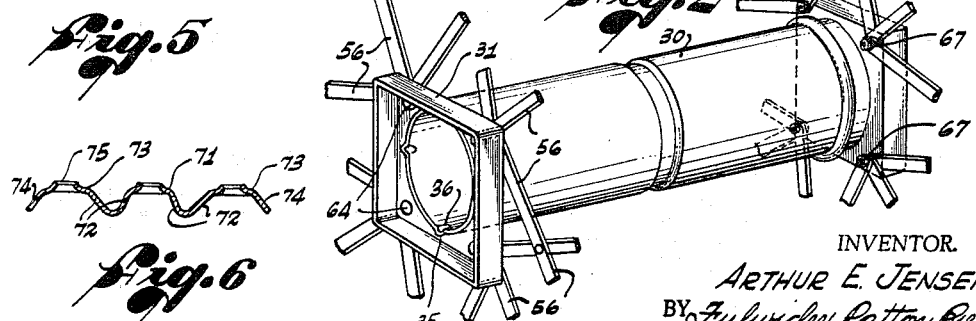
INVENTOR.
ARTHUR E. JENSEN
BY Fulwider, Patton, Rieber,
Lee, and Utecht
ATTORNEYS

United States Patent Office 3,218,105
Patented Nov. 16, 1965

3,218,105
AGRICULTURAL WHEEL CONSTRUCTION
Arthur E. Jensen, 11372 SW. Skyline Drive,
Santa Ana, Calif.
Filed Nov. 26, 1963, Ser. No. 326,281
8 Claims. (Cl. 301—53)

This is a continuation-in-part of my co-pending application, Serial No. 45,103, filed July 25, 1960, now Patent No. 3,147,764.

The present invention relates to agricultural apparatus and more particularly to an improved wheel construction.

An object of my invention is to provide an improved agricultural wheel construction particularly adapted for use with wheel-move irrigation pipe lines, as for example, that shown in my aforesaid co-pending application. However, it will be understood that the wheel may be used in connection with other agricultural apparatus.

A further object of the invention is to provide an improved wheel structure that is lighter in weight and yet is greatly improved in strength. This is of particular importance in connection with wheel-move irrigation apparatus wherein lightness without sacrifice of strength minimizes the power requirements for moving the irrigation line from place to place in the field under irrigation.

Another object of the invention is to provide a wheel construction adapted for making wheels of varying diameters to provide support for irrigation apparatus to clear either low or very tall crops.

It is also an object of the invention to provide a wheel construction comprising parts for large wheels which can be shipped in disassembled or knock-down form in relatively small packages, but on the other hand is adapted for very quick assembly in a field shop.

Yet another object of the invention is to provide a wheel construction incorporating an improved rim configuration adapted for more positive traction on wet ground. This feature is of importance in wheel-move irrigation pipe lines since the soil is almost invariably wet when the line is being moved from one place to another and if the wheels are allowed to slip as they roll over the ground the line tends to become bowed, some of the wheels may be dragged over the ground rather than roll, or greater power must be applied to the line in order to accomplish its movement.

The foregoing and other objects and advantages of my invention will be apparent from the following description of a presently preferred embodiment thereof when taken in conjunction with the annexed drawing.

FIGURE 1 is a partial side elevational view of an agricultural wheel incorporating my invention;

FIGURE 2 is a partial perspective view of the hub assembly portion of the wheel shown in FIGURE 1;

FIGURE 3 is a partial exploded perspective view of a portion of the rim of the wheel shown in FIGURE 1;

FIGURE 4 is a partial side elevational view of an alternative form of spoke pattern and hub connection;

FIGURE 5 is a partial perspective view of an alternative form of rim configuration;

FIGURE 6 is a sectional view taken on the line 6—6 of FIGURE 5.

Referring to the drawing, the presently preferred embodiment of wheel shown in FIGURE 1 has a rim made up of a plurality of interconnected arcuate sections 51, a plurality of spokes 56, and a hub assembly comprising a short piece of tube 30 having a pair of flange members 31 on its opposite ends. The illustrated wheel is particularly adapted for use in wheel-move lines of the type disclosed in my aforementioned patent application wherein the short hub section 30 comprises both a portion of the pipeline itself and a portion of the coupler to interconnect adjacent section of the pipe. The flange members 31 are similarly specifically adapted to constitute a part of the coupler means but it is to be appreciated that the wheel of the present invention may be constructed with a solid hub, or a hub which is not a part of the irrigation line, and may be provided with flanges which need not be of the female coupler type shown, since other flange configurations may be utilized for interconnecting the inner ends of the spokes to the hub structure.

The wheel may be made to any desired diameter suitable for supporting the irrigation pipe string to clear the ultimate level of the crop being irrigated. In some instances, this may call for a wheel diameter of 16 feet. Either the spoke pattern of FIGURE 1 or FIGURE 4 can be used, but as the spoke pattern shown in FIGURE 4 makes allowance for a greater number of spokes and, therefore, greater strength, that pattern is preferable for the largest sizes of wheel. While the wheel shown in FIGURE 1 has a rim made of a relatively great number of separate arcuate sections, it is to be understood that in the smaller sizes at least, but two arcuate rim sections need be used, each of these slightly exceeding 180° in length and having its ends overlapping the ends of the other section to define a complete circle. Whether two or a greater number of separate rim sections are to be used, it will be apparent to those skilled in the art that the extent of overlapping of adjacent sections should be sufficient to prevent buckling of the assembled rim.

Referring now to FIGURE 1, the wheel has a rim comprising a relatively great number of rim sections 51. The figure shows a spoke and rim pattern suitable for a six foot diameter wheel and in this case the rim consists of 12 of the sections 51.

The rim sections have a cross-sectional configuration illustrated in FIGURE 3. Thus, each section is formed with a deep central channel defined by side walls 52 that are disposed generally radially with respect to the center of the arc subtended by the rim section. The depth of the groove defined by the side walls and the generally radial inclination of the side walls is of importance to provide a sufficient beam depth to prevent flexure of the rim section, whether it be a relatively short section 51 or a substantially semicircular section. On axially opposite sides of this central groove the rim section has a pair of bearing surfaces 53 of appreciable axial length, serving as bearing surfaces for the radially outermost ends of the wheel spokes. These surfaces 53 are formed with a plurality of spaced apart dimples 54, which protrude outwardly of the rim to augment the traction of the wheel. The surfaces 53 develop into flanges 55 on opposite sides of each rim section.

Referring now to FIGURE 1 it will be seen that the wheel has a pattern of twelve generally similar spokes 56. In the assembly of the wheel these spokes are first secured to one of the flange members 31 of a hub 30 at their radially inner ends and the rim segments 51 are then initially loosely interconnected at outer ends of the spokes. As is shown in FIGURE 3, each of the spokes 56 has a flanged upper end 57 formed with an opening 58 alignable with openings 59 formed in the ends of the rim sections. As is apparent, after the openings 59 of the rim sections have been aligned, a bolt 60 can be passed therethrough and through the aligned opening 58 of the spoke flange and then into a nut 61. Initially, the bolts 60 are only loosely engaged with their nuts 61 until all of the rim sections 51 have been assembled.

The tubular hub 30 may be made from a relatively short section of irrigation pipe. At the extreme opposite ends, the hub 30 exteriorly mounts a pair of flange members 31 which may be of female coupling configuration, although they need not be. While the flange members 31 could be formed integrally with the hub 30 they may be separate one-piece members, as shown, with a central opening to receive the hub snugly, the central opening being formed with at least one notch 35 to receive a complementary dimple 36 pressed in the corresponding end of the hub 30 and thus keyed to the member. The hub 30 and flange members 31 are thereby coupled together for co-rotation. The threaded shank of the bolt 64 extends axially inwardly of the hub 30 and passes through suitable openings formed in the lower ends of a plurality of the spokes 56, which are secured in place under a suitable washer and nut 67. The nut 67 is fastened securely before the bolts 60 which secure the outer ends of the spokes 56 are snugged up.

After all of the spokes 56 have been secured tightly in place at the radially inner ends, all of the bolts 60 in the nuts 61 at the outer ends of the spokes are run into the nuts 61 at the outer ends of the spokes and all of the spokes have a length between the radially inner and outer end fastenings so as to be tautly tensilely stressed. Referring to FIGURE 2, it will be noted that crossing pairs of spokes 56 are secured together by a rivet or other suitable fastener 68.

When the fasteners 60 are all tightened to substantially the same extent with a suitable torque limiting means, all of the spokes 56 are tensioned to substantially the same degree. In order to prevent bending of each rim section 51 in the span between spokes 56, the central groove of the rim sections must be deep enough to provide sufficient beam depth in the side walls 52 defining the groove. This permits the construction of a very strong, light-weight wheel which does not buckle under heavy loads even though the extent of overlap of adjacent ends of a pair of the short rim sections 51 are held to a minimum.

FIGURE 4 illustrates an alternative spoke pattern for the wheel. In this case the hub 30 mounts a pair of opposite end flange members 31' which are substantially similar to the members 31 but instead of having the spoke fastener holes formed in the corners, each has eight equally circularly spaced apart fastener holes. Each of these holes receives a fastening means such as is shown in FIGURE 2 for mounting the radially inner ends of two spokes 56' on each fastener. Thus, the wheel construction of FIGURE 4 has two sets of 16 spokes while the wheel of FIGURE 1 has two sets of 12 spokes.

It will be observed in FIGURE 4 that one spoke 56' of each pair having a common fastener at the radially innermost end is disposed generally radially, while the other spoke of the pair is disposed generally tangentially to the hub 30. Similarly, referring to FIGURE 1, one spoke 56 extends generally radially from each corner of the female coupling member 31 while the other two spokes extending from the corner are disposed generally tangentially to the hub 30. In order to prevent any buckling tendency in the non-radially disposed spokes of both wheels, pairs of such spokes are interconnected by the rivets 68 at their crossing. Thus, radially disposed trusses are defined around the wheel hub to prevent torsional strain despite the light weight wheel construction.

FIGURES 5 and 6 show an alternative configuration for the rim which I have found to be quite successful for insuring positive traction on wet ground. The rim 70 has a medial arcuately or circumferentially extending bearing surface 71 of appreciable axial dimension that is flanked on both sides by a pair of channels or grooves. As is best seen in FIGURE 6, each of these grooves is generally V-shaped in cross-sectional configuration being defined by sloping side walls 72 having a generally radial inclination and a sufficient depth to give a beam action which will prevent excessive flexure of the rim. Another pair of bearing surfaces 73 are formed at axially opposite sides of the rim 70 and develop into flanges 74 turning radially inwardly.

Each of the bearing surfaces 71 and 73 is formed throughout its length with a plurality of preferably equally spaced apart perforated dimples 75, having sharp edged walls protruding outwardly of the rim. The perforations in the dimples are very effective in allowing a wheel that is standing in mud to break loose from the mud and to roll over wet ground. Thus, as the perforations allow penetration of the wet soil, the rim is in effect keyed thereto and has a better purchase and better traction for starting the wheel into motion and keeping it rolling.

It will be apparent in carrying out the invention that a great many variations from the specific details of construction hereinabove set forth are possible. Accordingly, it is to be understood that I do not mean to be limited to such details, but only by the spirit and scope of the following claims.

I claim:
1. A wheel for agricultural apparatus which includes a hub and a rim, and a plurality of spokes interconnected between said hub and said rim, and in which said rim is fabricated of a sheet material and has a plurality of integrally formed dimples pressed outwardly of the rim to a height from substantially one to three times the thickness of the rim and being spaced circumferentially around said rim, said dimples projecting radially outwardly of said rim, and in which said perforations are formed in the peak of said dimples whereby the walls of said dimples are adapted to penetrate the soil for keying said rim to the soil.

2. A wheel for agricultural apparatus which includes a hub and a rim, and a plurality of spokes interconnected between said hub and said rim, and in which said rim is fabricated of a sheet material having a substantially radially disposed and circumferentially extending integral wall portion providing a beam depth adapted to prevent bending of said rim in the area between spokes, said rim having a plurality of dimples spaced circumferentially around said rim in bearing areas of said rim outside of said integral wall portion providing a beam depth, said dimples projecting radially outwardly of said rim and being formed in the peaks of said dimples with perforations whereby the walls of said dimples are adapted to penetrate the soil and through which perforations soft or wet soil can penetrate through the thickness of said sheet material of said rim whereby said rim is keyed to said soil to prevent slippage when torque is applied to said wheel.

3. A wheel for agricultural apparatus which includes a rim consisting of a plurality of interconnected rim sections and a hub having a coaxial pair of opposite end members extending radially outwardly from said hub, said rim and said end members being interconnected by a plurality of spokes on axially opposite sides of said wheel, and each of said end members having a plurality of fasteners each of which fasteners is a terminal connection for a plurality of said spokes.

4. A wheel as set forth in claim 3 in which said rim sections have bearing areas formed with a plurality of dimpled perforations, the walls of said dimpled perforations projecting outwardly beyond said bearing areas.

5. A wheel comprising: a plurality of arcuate rim sections affixed together in end-to-end overlapping relationship to define an endless rim; a hub having a pair of radially outwardly extending flanges on opposite ends of said hub; and a plurality of substantially equally tensioned spokes interconnected between each of said flanges and said rim, the outer ends of said spokes on each side of said wheel being circumferentially spaced apart on said rim, each of said rim sections having a substantially radially disposed circumferentially extending integral wall portion providing a beam depth adapted to prevent bending of said rim in the area between spokes.

6. A wheel as set forth in claim 5 in which some of said other spokes cross one another and are fastened others of said spokes extend generally radially outwardly but substantially tangentially to said tubular hub, pairs of said spokes crossing one another and being fastened together at their crossing to define a truss in combination with one of said flanges.

7. A wheel as set forth in claim 5 in which some of said spokes extend radially outwardly of said tubular hub and others of said spokes extend generally radially outwardly but substantially tangentially to said tubular hub, said flanges of said hub each having a plurality of fastener means, each of said fastener means securing the inner ends of one of said radial spokes and at least one of said tangentially extending spokes.

8. A wheel as set forth in claim 5 in which pairs of said other spokes across one another and are fastened together at their crossing to define a truss in combination with one of said flanges.

References Cited by the Examiner
UNITED STATES PATENTS

| | | | |
|---|---|---|---|
| 613,463 | 11/1898 | McCully. | |
| 1,297,631 | 3/1919 | Allen | 301—53 X |
| 1,442,030 | 1/1923 | Steele | 301—44 X |
| 2,132,955 | 10/1938 | Johnson | 301—44 X |

FOREIGN PATENTS

| | | |
|---|---|---|
| 502,138 | 2/1920 | France. |
| 520,160 | 2/1921 | France. |
| 371,518 | 4/1932 | Great Britain. |

ARTHUR L. LA POINT, *Primary Examiner*.